(12) United States Patent
Benayoun et al.

(10) Patent No.: US 8,635,620 B2
(45) Date of Patent: Jan. 21, 2014

(54) HARDWARE DEVICE FOR PROCESSING THE TASKS OF AN ALGORITHM IN PARALLEL

(75) Inventors: Alain Benayoun, Cagnes sur Mer (FR); Jean-Francois Le Pennec, Nice (FR); Patrick Michel, La Gaude (FR); Claude Pin, Nice (FR)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/365,360

(22) Filed: Feb. 3, 2012

(65) Prior Publication Data

US 2012/0131587 A1 May 24, 2012

Related U.S. Application Data

(63) Continuation of application No. 12/109,001, filed on Apr. 24, 2008, now Pat. No. 8,190,862, which is a continuation of application No. 11/322,378, filed on Jan. 3, 2006, now Pat. No. 7,383,311, which is a continuation of application No. 09/606,899, filed on Jun. 29, 2000, now Pat. No. 6,999,994.

(30) Foreign Application Priority Data

Jul. 1, 1999 (EP) .................................... 99480050

(51) Int. Cl.
*G06F 9/46* (2006.01)
*G06F 15/76* (2006.01)
*G06F 7/38* (2006.01)
(52) U.S. Cl.
USPC ............... 718/102; 718/104; 712/31; 712/32; 712/220

(58) Field of Classification Search
None
See application file for complete search history.

(56) References Cited

U.S. PATENT DOCUMENTS

| 3,914,744 | A | | 10/1975 | Brown |
| 4,412,285 | A | | 10/1983 | Neches et al. |
| 4,428,043 | A | | 1/1984 | Catiller et al. |
| 4,760,608 | A | | 7/1988 | Suzuki |
| 4,876,643 | A | * | 10/1989 | McNeill et al. ............... 710/110 |

(Continued)

OTHER PUBLICATIONS

Final Office Action dated May 30, 2013 in U.S. Appl. No. 13/365,376, 19 pages.

(Continued)

*Primary Examiner* — Abdullah Al Kawsar
(74) *Attorney, Agent, or Firm* — Mark Vallone; Roberts Mlotkowski Safran & Cole, P.C.

(57) ABSTRACT

A hardware device for concurrently processing a fixed set of predetermined tasks associated with an algorithm which includes a number of processes, some of the processes being dependent on binary decisions, includes a plurality of task units for processing data, making decisions and/or processing data and making decisions, including source task units and destination task units. A task interconnection logic means interconnect the task units for communicating actions from a source task unit to a destination task unit. Each of the task units includes a processor for executing only a particular single task of the fixed set of predetermined tasks associated with the algorithm in response to a received request action, and a status manager for handling the actions from the source task units and building the actions to be sent to the destination task units.

10 Claims, 4 Drawing Sheets

(56) References Cited

U.S. PATENT DOCUMENTS

| | | | |
|---|---|---|---|
| 5,136,708 A | 8/1992 | Lapourtre et al. | |
| 5,146,540 A | 9/1992 | Natarajan | |
| 5,307,485 A | 4/1994 | Bordonaro et al. | |
| 5,321,842 A | 6/1994 | Fairfield et al. | |
| 5,349,682 A * | 9/1994 | Rosenberry | 718/102 |
| 5,357,632 A * | 10/1994 | Pian et al. | 718/105 |
| 5,371,896 A * | 12/1994 | Gove et al. | 712/20 |
| 5,430,850 A | 7/1995 | Papadopoulos et al. | |
| 5,440,740 A | 8/1995 | Chen et al. | |
| 5,504,670 A * | 4/1996 | Barth et al. | 700/5 |
| 5,592,634 A | 1/1997 | Circello et al. | |
| 5,701,482 A * | 12/1997 | Harrison et al. | 718/105 |
| 5,822,606 A | 10/1998 | Morton | |
| 5,828,568 A | 10/1998 | Sunakawa et al. | |
| 5,838,968 A | 11/1998 | Culbert | |
| 5,864,699 A * | 1/1999 | Merryman | 718/104 |
| 5,867,704 A | 2/1999 | Tanaka et al. | |
| 5,870,301 A | 2/1999 | Yakushiji et al. | |
| 5,991,794 A | 11/1999 | Hodges et al. | |
| 5,991,808 A | 11/1999 | Broder et al. | |
| 6,041,016 A | 3/2000 | Freker | |
| 6,154,821 A | 11/2000 | Barth et al. | |
| 6,247,110 B1 | 6/2001 | Huppenthal et al. | |
| 6,278,707 B1 | 8/2001 | MacMillan et al. | |
| 6,289,488 B1 | 9/2001 | Dave et al. | |
| 6,320,446 B1 | 11/2001 | Podlesny et al. | |
| 6,330,658 B1 * | 12/2001 | Evoy et al. | 712/31 |
| 6,389,446 B1 * | 5/2002 | Torii | 718/100 |
| 6,412,070 B1 | 6/2002 | Van Dyke et al. | |
| 6,434,590 B1 | 8/2002 | Blelloch et al. | |
| 6,496,881 B1 | 12/2002 | Green et al. | |
| 6,513,057 B1 * | 1/2003 | McCrory | 718/102 |
| 6,625,752 B1 | 9/2003 | Kader et al. | |
| 6,633,916 B2 * | 10/2003 | Kauffman | 709/229 |
| 6,999,994 B1 | 2/2006 | Benayoun et al. | |
| 7,383,311 B2 | 6/2008 | Benayoun et al. | |

OTHER PUBLICATIONS

Final Office Action dated Mar. 15, 2013 in U.S. Appl. No. 13/365,376, 14 pages.
Office Action for U.S. Appl. No. 13/365,376 dated Sep. 12, 2012.
Notice of Allowance dated Aug. 5, 2013 in related U.S. Appl. No. 13/365,376, 6 pages.

* cited by examiner

| LEVEL m to LEVEL m | T1 | T2 | T3L | T3R | T4L | T4R |
|---|---|---|---|---|---|---|
| T1 | | | V | K | | |
| T2 | | | | | V | K |
| T3 | | | | | | |
| T4 | | | | S,V | | |

| LEVEL m to LEVEL m+1 | T1 | T2 | T3L | T3R | T4L | T4R |
|---|---|---|---|---|---|---|
| T1 | S | | | | | |
| T2 | | S | | | | |
| T3 | | | S | S | | V |
| T4 | | | | | | |

US 8,635,620 B2

HARDWARE DEVICE FOR PROCESSING THE TASKS OF AN ALGORITHM IN PARALLEL

CROSS-REFERENCE TO RELATED APPLICATIONS

The present application is a continuation application to U.S. application Ser No. 12/109,001, filed on Apr. 24, 2008, now U.S. Pat. No. 8,019,862, which is a continuation application to U.S. application Ser. No. 11/322,378, filed on Jan. 3, 2006, now U.S. Pat. No. 7,383,311, which is a continuation application to U.S. application Ser. No. 09/606,899, filed on Jun. 29, 2000, now U.S. Pat. No. 6,999,994, the contents of all of which are herein incorporated by reference in their entireties. The present application also claims priority under 35 U.S.C. §119 of European Application Ser. No. 99480050.6, filed on Jul. 1, 1999.

TECHNICAL FIELD

The invention relates to processing of algorithms used in the search engines of a large data communication network such as the Internet, and relates more particularly to hardware devices for processing the tasks of any algorithm in parallel.

BACKGROUND

The World Wide Web (WWW) provides accesses to a large body of information. Compared with traditional databases, Web information is dynamic and structured with hyperlinks. Also, it can be represented in different forms and is globally shared over multiple sites and platforms. Hence, querying over the WWW is significantly different from querying data from traditional databases, e.g. relational databases, which are structured, centralized and static. Traditional databases can cope with a small number of information sources; but it is ineffective for thousands.

Most Web documents are text-oriented. Most relevant information is usually embedded in the text and can not be explicitly or easily specified in a user query. To facilitate Web searching, many search engines and similar programs have been developed. Most of these programs are database based meaning that the system maintains a database, a user searches the web by specifying a set of keywords and formulating a query to the database. Web search aids are variously referred to as catalogs, directories, indexes, search engines, or Web databases.

A search engine is a Web site on the Internet which someone may use to find desired Web pages and sites. A search engine will generally return the results of a search ranked by relevancy.

A competent Web search engine must include the fundamental search facilities that Internet users are familiar with, which include Boolean logic, phrase searching, truncation, and limiting facilities (e.g. limit by field). Most of the services try more or less to index the full-text of the original documents, which allows the user to find quite specialized information. Most services use best match retrieval systems, some use a Boolean system only.

Web search engines execute algorithms having internal processes which are repetitive tasks with independent entry data. A classical step by step processing of all processes and decisions on one entry data before processing the next entry data is inefficient since it takes too much time to process all the data. Thus, it is common to perform a search of a pattern within each file of a disk. The main repetitive processes to perform are: load file, open file, scan each word and compare for matching with a pattern, append the result in a temporary file, close file.

One way to improve the performance, and in particular to improve the search response time, is to achieve parallel processing by parallelizing the search mechanism in the database or index table. Such software parallelization will be more optimized but is nevertheless limited insofar as the software processing, even if parallelized, requires a minimum of time which cannot be reduced.

SUMMARY OF THE INVENTION

Accordingly, the object of the invention is to provide a hardware assist device able to run a set of repetitive processes using local pipelining for each task, and maintaining a relationship between the parent task and the child task for each occurrence in the pipeline.

Another object of the invention is to provide a hardware device for processing the tasks of a search algorithm in parallel wherein each specific task of the search is made by a dedicated processor.

The invention relates therefore to a hardware device for processing the tasks of an algorithm of the type comprising a number of processes the execution of some of which depend on binary decisions, the device comprising a plurality of task units which are each associated with a task defined as being either one process or one decision or one process together with the following decision, and a task interconnection logic block connected to each task unit for communicating actions from a source task unit to a destination task unit, each task unit including a processor for processing the steps of the associated task when the received action requests such a processing and a status manager for handling the actions coming from other task units and building the actions to be sent to other task units

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION

Figure 1:
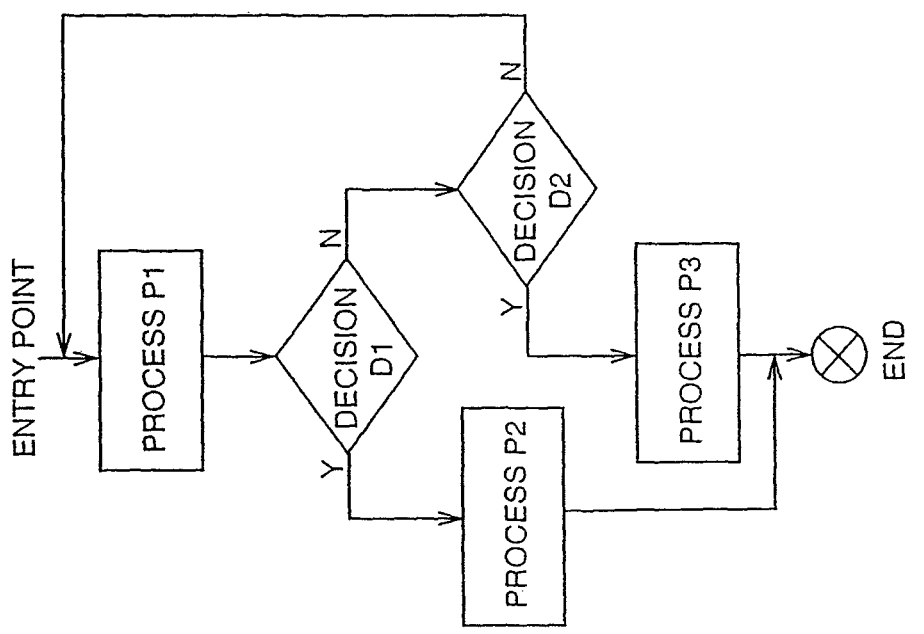
FIG. 1 represents an exemplary algorithm composed of three processes and three decisions.

The exemplary algorithm illustrated in FIG. 1 includes three processes $P_1$, $P_2$ and $P_3$ and two decisions $D_1$ and $D_2$. Depending on each decision, different functions corresponding to the different paths in the algorithm may be run. The first function is represented by the algorithm flow when decision $D_1$ is "yes", that is when processes $P_1$ and $P_2$ are to be executed. The second function is represented by the algorithm flow when decision $D_1$ is "no" and decision $D_2$ is "yes", that is when processes $P_1$ and $P_3$ are to be executed. Finally, the third function is represented by the algorithm flow when decision $D_1$ is "no" and decision $D_2$ is also "no", that is when only process $P_1$ is to be executed. In the latter case, the algorithm flow loops back to the entry point and the same functions may be executed again. Thus, during the first algorithm flow, process $P_1$ is started while the execution of process $P_1$ is started again when decision $D_2$ is "no". The second execution of $P_1$ starts only after the first execution of $P_1$ has been completed and decision $D_1$ and $D_2$ have been completed. Therefore, there is no overlap possible in a simple step by step processing of the algorithm.

Though the algorithm represented in FIG. 1 is very simple, all the algorithms are classically run in the same way. All the events (processes or decisions) of the algorithm flow have to be executed step by step although they are run repetitively with new entry data. The proposed invention allows the various processes and decisions to run separately in order to speed up the processing of the algorithm especially when there is no prior data required on some steps. The main idea to achieve this is to have one processor assigned to a task including a process, a decision or a combination of processes and decisions which will run all the repetitive instances of this task and will be linked to the execution result of the other task processors using a more detailed link information that the simple conventional link enabling the downstream tasks to be activated.

Figure 2:
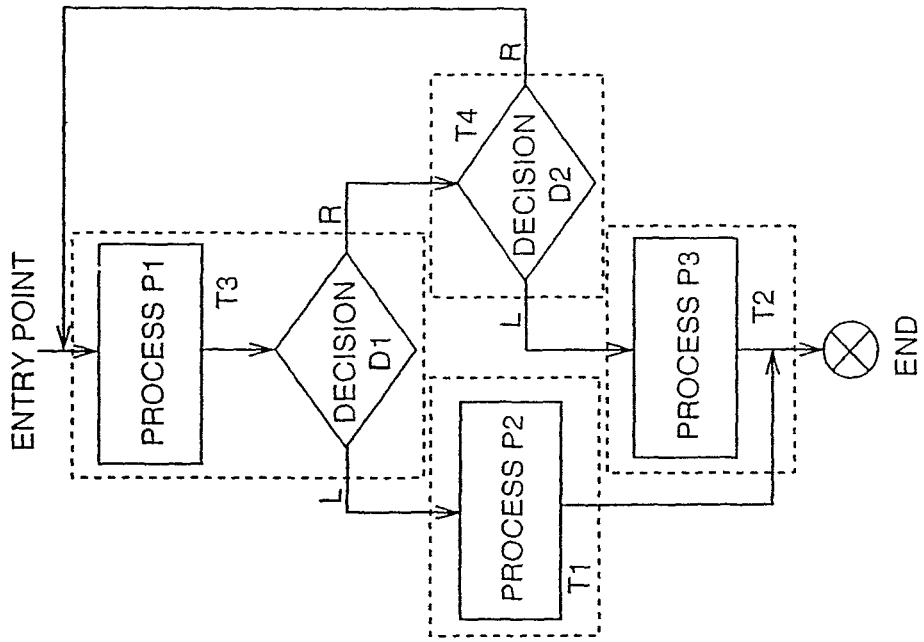
FIG. 2 represents the algorithm illustrated in FIG. 1 which has been structured into several tasks to be executed by the hardware device according to the invention.

Using the principles of the invention, the algorithm of FIG. 1 can be divided into tasks as illustrated in FIG. 2. Four tasks are thus implemented.

Task 1 ($T_1$) includes process $P_2$ (no decision)
Task 2 ($T_2$) includes process $P_3$ (no decision)
Task 3 ($T_3$) includes the sequential combination of process $P_1$ and decision $D_1$
Task 4 ($T_4$) includes only decision $D_2$ (no process)

According to the invention, each task is repetitively performed by one processor allocated to this task. Therefore, four processors will be required to run the example algorithm of FIG. 1 and FIG. 2.

Figure 3:
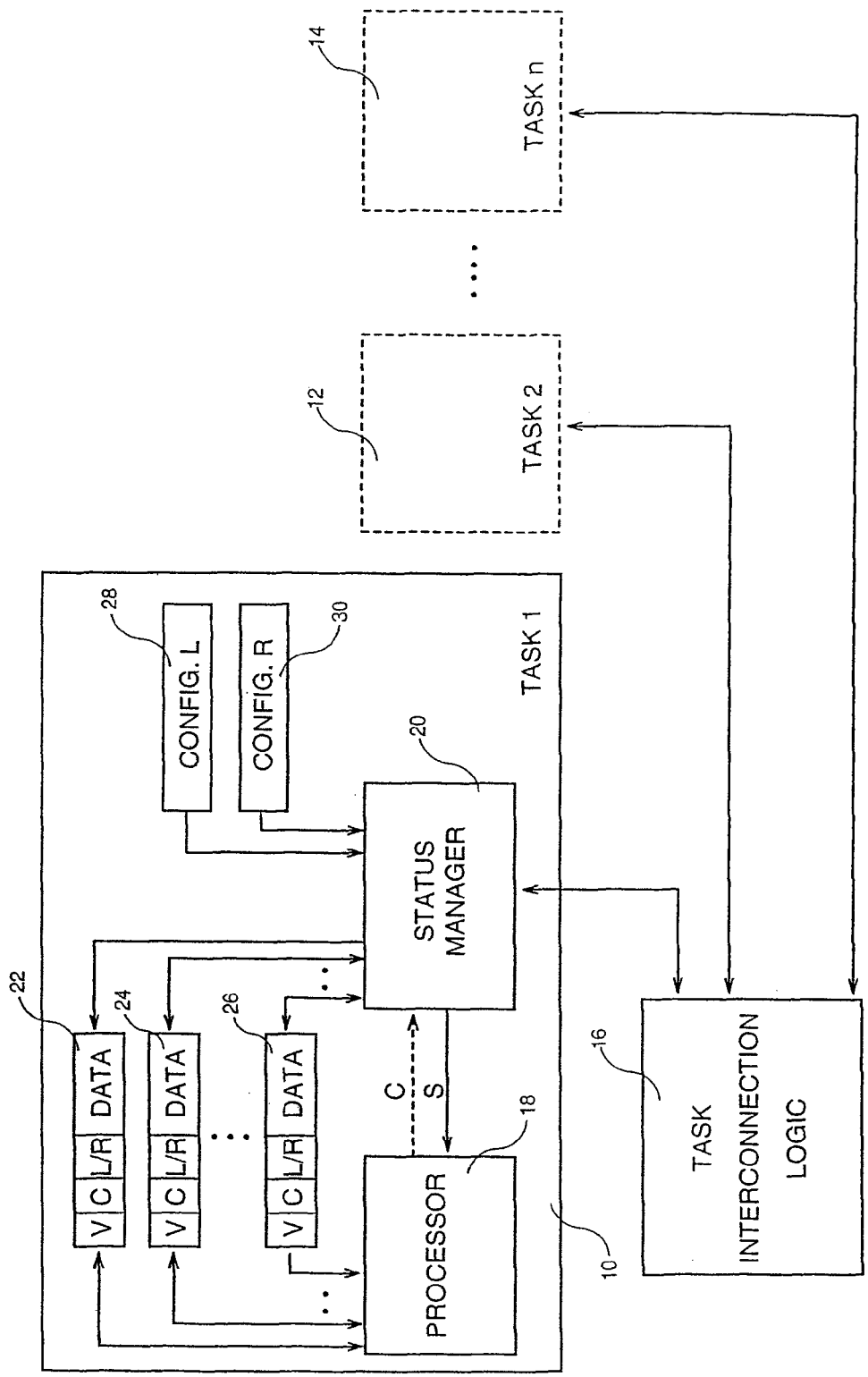
FIG. 3 is a block-diagram representing the hardware device according to the invention.

The hardware device according to the invention illustrated in FIG. 3 comprises as many task units 10, 12, 14 as the number of tasks included in the algorithm ($Task_1$, $Task_2$ ... $Task_n$). The interconnection between the tasks is performed by the intermediary of a Task interconnection logic block 16 as explained hereafter.

Each task unit like task unit 10 includes a processor 18 in charge of processing the sequential steps of the process, the decision or the combination of the process and the decision generally incorporated in the corresponding task. Actions received from other task units or sent to other task units by means of Task interconnection logic block 16 are managed by status manager 20 which is preferably a state machine. Status manager 20 is connected to processor 18 by two lines, an input line to processor 18 for starting (S) the task execution and the output line from the processor which is activated when the task is completed (C).

Status manager 20 has essentially two functions (input and output). The input function handles incoming commands from other tasks and the output function builds commands to be sent to other tasks. To perform these functions in conjunction with processor 18, several control/data registers 22, 24, 26 are used. Each control/data register corresponds, for this task, to an instance of the algorithm flow. The number of instances which can be run at the same time depends upon the pipeline capability of processor 18. Generally, it is necessary to have three control/data registers corresponding to instances m, m+1, m+2.

Each control/data register 22, 24 or 26 contains a control field and a data field. The control field is composed of three bits controlled by processor 18, a validation bit V, a completion bit C and a bit L/R indicating whether the output is Left of Right when the task includes a decision.

The data field of a control/data register contains data which are loaded by status manager 20 after receiving an action to be performed from another task and before starting the task execution by sending the start command to task processor 18. These data may be used by processor 18. When the latter has completed the task execution, it may replace the data contained in the control/data register by other data. This data will then be sent to the destination task in the command word and used as an input field by the destination task processor. However, it must be noted that, in case of independent tasks, the data are not modified in the control/data register.

When the task execution has been completed by processor 18, this one sets to 1 the bit C of the control field of the control data register and a signal C may be sent to status manager 20. Therefore, either status manager is activated by the input signal C from task processor 18, or there is a polling or an interrupt mechanism which enables the status manager to be informed of the setting of bit C to 1.

The commands which may be received from another task by status manager 20 are START, KILL or VALID. As already mentioned, the START command is used to activate task processor 18. The KILL command means that a task is no longer of interest since the taken decision is opposite to this task. Thus, a task which is the left path of a decision may be killed if the decision is to take the right path. When it receives a KILL command, status manager 20 clears the control data register corresponding to the instance being considered as each command has as a parameter the instance value called level. Conversely to the KILL command, the VALID command confirms that the considered task corresponds to the taken decision. In such a case, the bit V of the corresponding control/data register is set to 1 by status manager 20.

The output function of status manager 20 is to build commands based on the contents of two configuration registers, CONFIG.L 28 and CONFIG.R 30 and also on the contents of the involved control/data register. The contents of CONFIG.L register which is selected when bit L/R set to 1 are given in FIG. 4. Note that the CONFIG.R register which is selected when bit L/R is set to 0 has exactly the same structure as CONFIG.L register. Note that the CONFIG.L and CONFIG.R registers are loaded at the beginning of algorithm processing and remain unchanged insofar as they contain data fields depending only on the algorithm structure.

Figures 4, 5A, 5B:
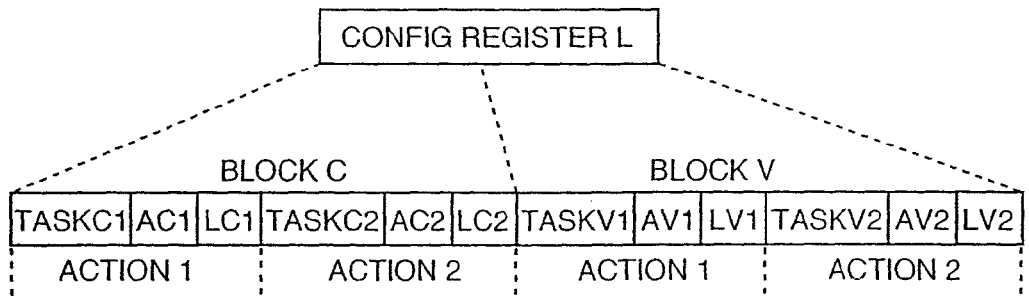
FIG. 4 is a representation of the configuration register used to control each task executed by the hardware device of FIG. 3.
FIGS. 5A and 5B are tables representing respectively the actions to be executed by each task of the algorithm illustrated in FIG. 1 in function of the possible activation sources for an instance and the following instance.

As illustrated in FIG. 4, CONFIG.L register contains a first block C selected when bit C is set to 1 and a second block V selected when bit V is set to 1. Each block C or V is used for two actions. For each action the register contains the three following fields wherein X=C or V and n=1 or 2.

Task Xn indicates which task should be activated

Axn indicates which action is to be performed. For example 00=kill, 01=start, 10=valid and 11=valid+start.

Lxn indicates the level of task (the instance) corresponding to Task Xn. For example, 00=current level−1, 01=current level, 10=current level+1, 11=current level+2.

The example of the algorithm illustrated in FIG. 2 will be considered below. In FIG. 2 there are four tasks $T_1$, $T_2$, $T_3$ and $T_4$ which can be executed, but there are six activation sources since Task 3 and Task 4 each have two outputs. Furthermore, a task acting as a source task can activate a destination task in the same level or in the following level. FIG. 5A and FIG. 5B represent tables wherein the activation sources are associated with the columns whereas the tasks to be activated are associated with the rows. FIG. 5A corresponds to the activation of the tasks in a same level whereas FIG. 5B corresponds to the activation of the tasks in level m+1 by activation sources in level m. It should be noted that since only two levels are represented, this means that there is no relationship between the processes of the algorithm on more than two consecutive levels.

In the tables illustrated in FIGS. 5A and 5B, only the cases corresponding to an action from an activation source to a task are filled with a letter. Letter S means Start, V means Validate and K means Kill. It must be noted that it is possible that a same source has an action on two tasks. Thus, $T_3R$ kills Task 1, and starts and validates Task $T_4$.

As already mentioned, status manager 20 (FIG. 2) uses the control bits which have been previously loaded in CONFIG.L and CONFIG.R registers associated with the task. Thus, if we consider Task 3 which generates two activation sources, the CONFIG.L and CONFIG.R registers have the following contents:

---
CONFIG.L
1. Block C
    Action 1 Task $C_1$=Task 3
        $AC_1$=start
        $LC_1$=current level+1
    Action 2 none
2. Block V
    Action 1 Task $V_1$=Task 1
        $AV_1$=valid
        $LV_1$=current level
    Action 2 none
CONFIG.R
1. Block C
    Action 1 Task $C_1$=Task 3
        $AC_1$=start
        $LC_1$=current level+1
    Action 2 none
2. Block V
    Action 1 Task $V_1$=Task 1
        $AV_1$=kill
        $LV_1$=current level
    Action 2 Task $V_2$=Task 4
        $AV_2$=valid+start
        $LV_2$=current level

---

Figure 6:
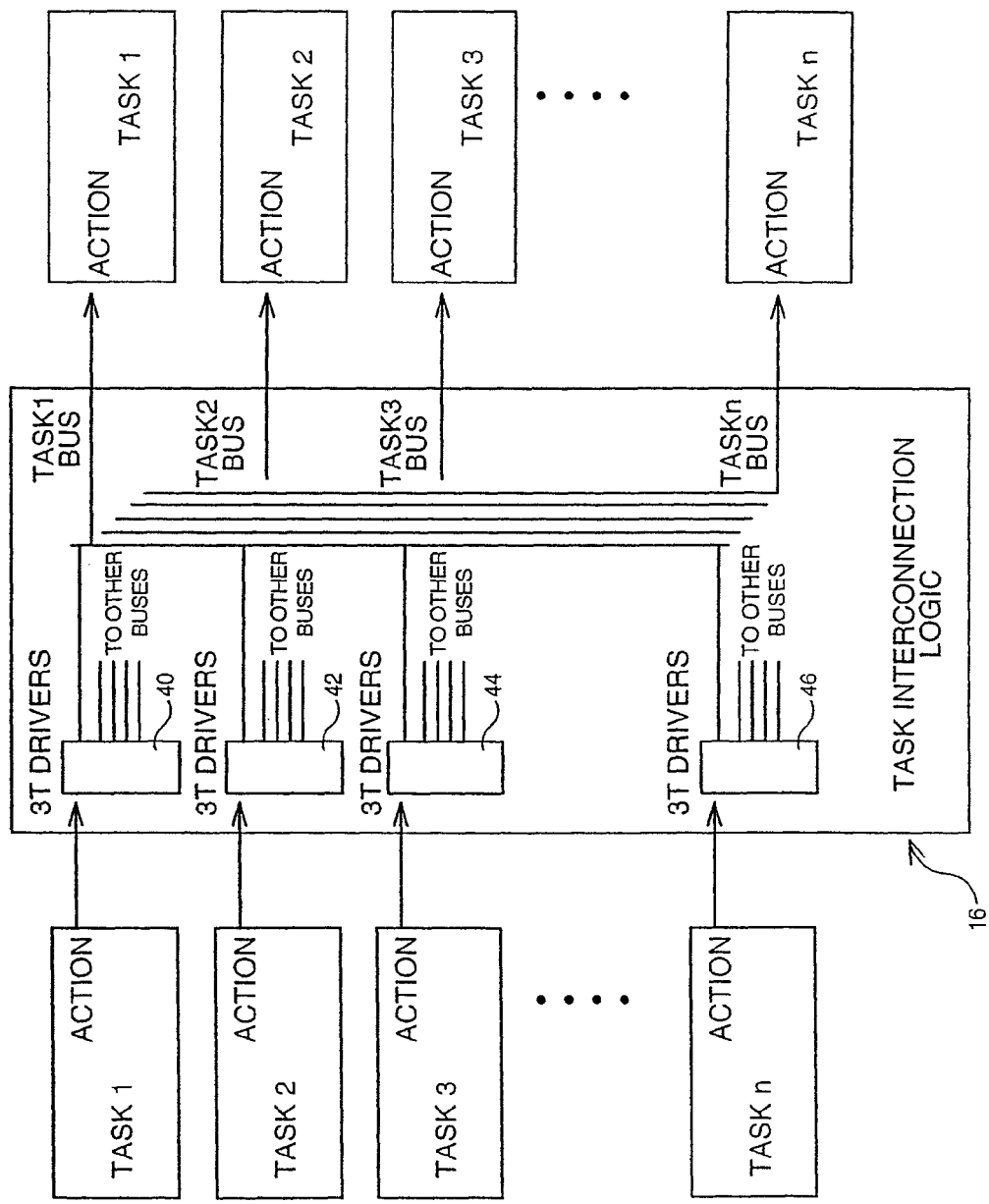
FIG. 6 is a block-diagram representing the connection between the task interconnection logic block of the hardware device of FIG. 3 and the different tasks of the algorithm.

The Task interconnection logic block 16 is represented in FIG. 6. Each task such as Task 1, Task 2, Task 3, . . . Task n is an input to Task interconnection logic block 16 but is also an output to this block. Each input action or command could be of the same type as each one of the output actions such as KILL, START or VALID. Using the CONFIG.L and CONFIG.R registers where an action is represented by three control fields Task Xn, Axn and Lxn, an action word may use this control fields in addition to the corresponding data (see FIG. 4) to transmit the action to the destination task.

In the preferred embodiment illustrated in FIG. 6, the action word containing the control bits of CONFIG.L or CONFIG.R registers and data is input to a three-state driver 40, 42, 44 or 46 where the Task Xn field is decoded in order to select on which bus this action word should be put. This word, or the remaining bits insofar as the Task Xn field is no longer used, are then decoded by the appropriate task to perform the requesting action.

As illustrated in FIG. 6, there are as many buses as the number of tasks. These buses are three-state so that all inactive inputs have no influence in the bus value. Only the valid one forced by the corresponding driver takes the bus for its command. The width of the bus depends on the size of the action word. In the preferred embodiment the bus size is equal to word size. If there is a problem in the size of the bus, it is well known how to split the word into several blocks appended when sent on a smaller bus. The only drawback of this split will be an increased transmission latency as it will need several clock times to transmit a command or action from one output task to an input task. At least, the Task Xn should be available in the first block of the split word to be decoded correctly.

Each task can then put all the actions on the various buses. As long as there is no capability to have an action simultaneously put on the same bus by two tasks, there is no arbitration required. This is the case for most of the algorithms. Otherwise, an arbitration mechanism may be added on the control of each three-state driver to identify two simultaneous requests for the same destination. A very simple contention mechanism will for example give the priority on the destination bus to the lower source task.

What is claimed is:

1. A hardware device for concurrently processing a fixed set of predetermined tasks associated with an algorithm which includes a number of processes, some of the processes being dependent on binary decisions, the device comprising:
    a plurality of task units for processing data, making decisions and/or processing data and making decisions, including source task units and destination task units;
    a task interconnection logic means interconnecting the task units for communicating actions from a source task unit to a destination task unit; and
    each of the task units including:
        a processor for executing only a particular single task of the fixed set of predetermined tasks associated with the algorithm in response to a received request action;
        a status manager for handling the actions from the source task units and building the actions to be sent to the destination task units; and
        a plurality of control/data registers each corresponding, for a task associated with a task unit of the plurality of task units, to an instance of the algorithm, each one of the control/data registers comprising a control field composed of a completion bit set to 1 when the task associated with the task unit is completed, a validation bit set to 1 when the task associated with the task unit is validated and a L/R bit indicating that an output in an algorithm flow is left or right when the task associated with the task unit includes a decision.

2. The hardware device according to claim 1, wherein the status manager is for polling the completion bit to be informed of the completion bit being set to 1.

3. The hardware device according to claim 2, wherein the actions communicated from the source task unit to the destination task unit are START used to activate the processor of the destination task unit, KILL used to cancel a task associated with the destination task unit and VALID used to confirm that the task associated with the destination task unit corresponds to a decision included in the task associated with the destination task unit.

4. The hardware device according to claim 3, wherein the status manager activates the processor for processing steps of the task associated with the destination task unit when at least one of the actions received from the source task unit is START.

5. The hardware device according to claim 1, wherein the completion bit is sent by the processor to the status manager after completion of task execution.

6. A method for concurrently processing a fixed set of predetermined tasks associated with an algorithm which includes a number of processes, some of the processes being dependent on binary decisions, the method comprising:
- processing data, making decisions and/or processing data and making decisions, by a plurality of task units including source task units and destination task units;
- interconnecting the task units for communicating actions from the source task units to the destination task units;
- executing only a particular single task of the fixed set of predetermined tasks associated with the algorithm in response to a received request action;
- handling the actions from the source task units and building the actions to be sent to the destination task units; and
- setting a plurality of control/data registers each corresponding, for a task associated with a task unit of the plurality of task units, to an instance of the algorithm, each one of the control/data registers comprising a control field composed of a completion bit set to 1 when the task associated with the task unit is completed, a validation bit set to 1 when the task associated with the task unit is validated and a L/R bit indicating that an output in an algorithm flow is left or right when the task associated with the task unit includes a decision.

7. The method according to claim 6, further comprising polling the completion bit to be informed of the completion bit being set to 1.

8. The method according to claim 7, wherein the actions communicated from the source task unit to the destination task unit are START used to activate a processor of the destination task unit, KILL used to cancel a task associated with the destination task unit and VALID used to confirm that the task associated with the destination task unit corresponds to a decision included in the task associated with the destination task unit.

9. The method according to claim 8, further comprising activating the processor for processing steps of the task associated with the destination task unit when at least one of the actions received from the source task unit is START.

10. The method according to claim 6, further comprising sending the completion bit to a status manager after completion of task execution.

* * * * *